2,838,501
Patented June 10, 1958

2,838,501

6-FLUORO-11-OXYGENATED PROGESTERONES AND PROCESS FOR PREPARING SAME

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,503

25 Claims. (Cl. 260—239.55)

The present invention relates to steroid compounds and is more particularly concerned with 6-fluoro-11β-hydroxy-progesterone, 6-fluoro-11α-hydroxyprogesterone and 6-fluoro-11-ketoprogesterone and intermediates therefor, and a process for the production thereof.

The new compounds and the process of the present invention are illustratively represented by the following formulae:

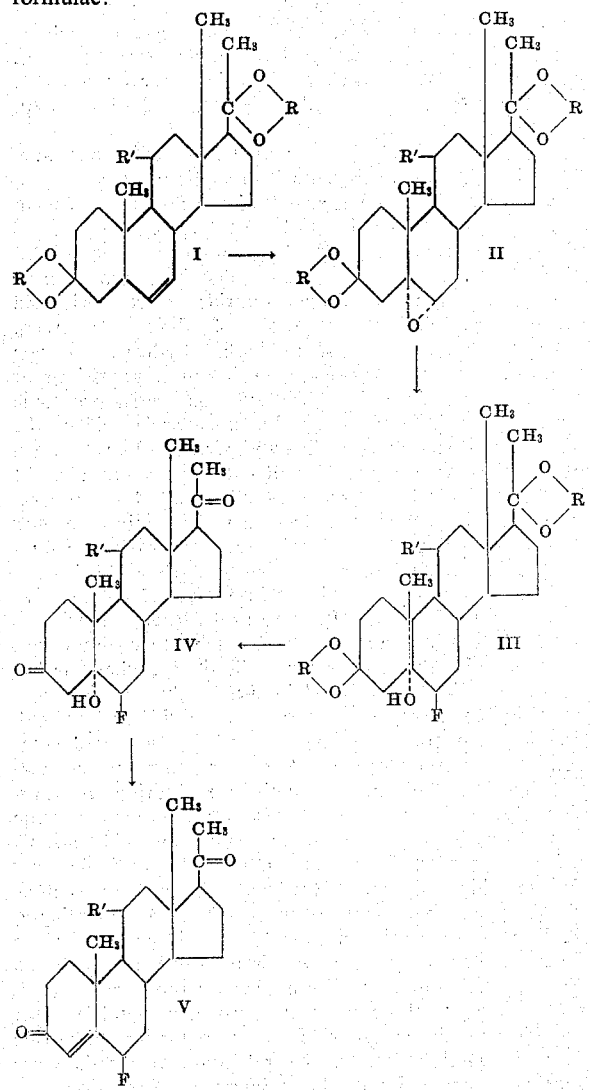

wherein R is an alkylene radical containing one to eight carbon atoms, inclusive, the attaching oxygen-to-carbon bonds are separated by a chain of at least two and not more than three carbon atoms, and R' is keto, α-hydroxy or β-hydroxy.

The process of the present invention comprises treating an 11-oxygenated progesterone 3,20-bis-(alkylene ketal) (I), in which the 11-oxygen function is keto or hydroxy, the alkylene radical contains not more than eight carbon atoms, and the attaching oxygen-to-carbon bonds are separated by a chain of at least two and not more than three carbon atoms, with a peracid, such as performic, peracetic and perbenzoic, to obtain the corresponding 11-oxygenated 5α,6α-oxidopregnane-3,20-dione 3,20-bis-(alkylene ketal) (II); treating the thus obtained 5α,6α-oxido compound with a fluorinating agent such as hydrogen fluoride to obtain the corresponding 11-oxygenated 5α-hydroxy-6β-fluoropregnane-3,20-dione 3,20-bis-(alkylene ketal) (III); treating the latter bisketal with an aqueous acid in a suitable solvent to remove the ketal groups and produce an 11-oxygenated 5α-hydroxy-6β-fluoropregnane-3,20-dione (IV), and treating the latter compound with a dehydrating agent such as a base or, preferably, an acid to obtain 11-oxygenated 6-fluoro-progesterone (V) (both the 6α and 6β-epimers). To obtain the 6β-epimer, treatment with a base is preferred, as will be described subsequently.

In the dehydration step, higher concentrations of acid produce the 6α-epimer, while lower concentrations of acid produce the 6β-epimer. If a base is used, such as aqueous sodium or potassium hydroxide, low concentration and temperature gives the 6β-epimer while high concentration gives the 6α-epimer. 6β-fluoro-11-keto-progesterone and 6β-fluoro-11-β-hydroxyprogesterone can also be converted to the corresponding 6α-fluoro epimers by enolizing agents such as strong mineral acids, e. g., sulfuric, perchloric, hydrochloric, nitric (dilute) and the like. Treatment of the 6β-epimers with bases such as sodium and potassium hydroxide is also productive of the 6α-epimers.

The above process can be modified without altering the concept of the invention. Depending upon cost and availability of starting materials, yields, and other economic factors, such modification may be desirable. For example, starting with 11-ketoprogesterone, preparing the bis-(alkylene ketal), and following the above process to obtain 5α-hydroxy-6β-fluoropregnane-3,11,20-trione 3,20-bis-(alkylene ketal), treating the said compound with lithium aluminum hydride to obtain 5α,11β-dihydroxy-6β-fluoropregnane-3,20-dione, 3,20-bis-(alkylene ketal), and subjecting the latter compound to hydrolysis and dehydration as described hereinabove is productive of 6-fluoro-11β-hydroxyprogesterone. Treating 6-fluoro-11β-hydroxyprogesterone with chromium trioxide in acetic acid is productive of 6-fluoro-11-ketoprogesterone.

Starting with 11α-hydroxyprogesterone 3,20-bis-(alkylene ketal) (prepared in the manner of Example 1 by substitution of 11α-hydroxyprogesterone for 11-ketoprogesterone), treating the 11α-hydroxyprogesterone 3,20-bis-(alkylene ketal) with peracetic acid to produce 5α,6α-oxido-11α-hydroxypregnane-3,20-dione 3,20-bis-(alkylene ketal), treating the latter compound with hydrogen fluoride to produce 5α,11α-dihydroxy-6β-fluoropregnane-3,20-dione 3,20-bis-(alkylene ketal), treating the latter compound with aqueous acid in a suitable solvent to produce 5α,11α-dihydroxy-6β-fluoropregnane-3,20-dione, and dehydrating the thus obtained 5α,11α-dihydroxy-6β-fluoropregnane-3,20-dione with a base or, preferably, with an acid reagent is productive of 6-fluoro-11α-hydroxy-4-pregnane-3,20-dione (6-fluoro-11α-hydroxyprogesterone). Oxidation of 6-fluoro-11α-hydroxyprogesterone with chromium trioxide in acetic acid is productive of 6-fluoro-11-ketoprogesterone.

Alternatively, 6-fluoro-11β-hydroxyprogesterone and 6-fluoro-11-ketoprogesterone are produced by treating 11β-hydroxypregnenolone or 11β-hydroxypregnenolone 3-acetate with peracetic acid to obtain 3β,11β-dihydroxy-5α,6α-oxidopregnan-20-one or the 3-acetate; treating the thus produced 3β,11β-dihydroxy-5α,6α-oxidopregnan-20-one, or 3-acetate, with hydrogen fluoride to obtain 3β,5α,11β-trihydroxy-6β-fluoropregnan-20-one or acetate; if the acetate is made, treating the said acetate with aqueous alkali or acid to hydrolyze the 3β-acetoxy group to a 3β-hydroxyl; oxidizing the 3β,5α,11β-trihydroxy-6β-fluoropregnan-20-one, as by an Oppenauer oxidation using aluminum isopropoxide and acetone, to produce 5α,11β - dihydroxy - 6β - fluoropregnane - 3,20 - dione, and treating the latter compound with a dehydrating agent such as a mineral acid to obtain 6-fluoro-11β-hydroxyprogesterone, which can then be oxidized to 6-fluoro-11-ketoprogesterone, for example, with sodium dichromate in acetic acid.

It is an object of the instant invention to provide 6-fluoro-11-oxygenated progesterones (both the 6α and the 6β-epimers), wherein the 11-oxygen function is keto, 11α-hydroxy or β-hydroxy, and intermediates for the production thereof, such as 11-oxygenated 5α,6α-oxidopregnane-3,20-dione 3,20-bis-(alkylene ketal) having from one to eight carbon atoms in the alkylene chain and 11-oxygenated 5α-hydroxy-6β-fluoropregnane-3,20-dione and the 3,20-bis-(alkylene ketals) thereof. It is another object of the instant invention to provide a process for the production of 6-fluoro-11-oxygenated progesterones and intermediates such as 11-oxygenated 5α,6α-oxidopregnane-3,20-dione, 3,20-bis-(alkylene ketal) and 11-oxygenated 5α-hydroxy-6β-fluoropregnane-3,20-dione and the 3,20-bis-(alkylene ketals) thereof. An additional object of the instant invention is to provide 6α-fluoro-11β-hydroxyprogesterone and 6α-fluoro-11-ketoprogesterone. Other objects will be apparent to those skilled in the art to which this invention pertains.

The compounds of this invention possess valuable glycocorticoid and anti-inflammatory activities. Thus, for example, 6α-fluoro-11-ketoprogesterone has been found to exhibit about two times the glucocorticoid activity of hydrocortisone and approximately the same anti-inflammatory activity as hydrocortisone, while having little effect on the normal rates of sodium excretion and water loss. 6β-fluoro-11-ketoprogesterone has been found to exhibit glucocorticoid activity and is an active uterotrophic agent. 6α-fluoro-11β-hydroxyprogesterone has been shown to have marked anti-inflammatory activity. These compounds are useful in the treatment of inflammatory conditions of the skin, eyes and ears of humans and of valuable domestic animals, as well as contact dermatitis and other allergic reactions. Compositions containing the compounds of the present invention can be prepared for human or animal use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products.

The novel compounds can also be administered topically in the form of ointments, creams, lotions and the like, with or without coacting antibiotics, germicides, or other materials forming advantageous combinations therewith.

These compounds are additionally useful as intermediates in the production of 6-fluoro-9α-halo-11β-hydroxyprogesterone, 6-fluoro-9α-halo-11-ketoprogesterone, 1-dehydro - 6 - fluoro - 11β - hydroxyprogesterone, 1 - dehydro-6-fluoro-11-ketoprogesterone, 1-dehydro-6-fluoro-9α-halo-11β-hydroxyprogesterone and 1-dehydro-6-fluoro-9α-halo-11-ketoprogesterone, wherein the 9α-halogen is of atomic weight of seventeen to eighty, inclusive, that is, fluorine, chlorine, and bromine. The 9α-halo derivatives are of particular importance because they possess a combination of high anti-inflammatory and glucocorticoid properties with low concomitant mineralocorticoid activity.

The starting compounds of the instant invention are 11-oxygenated progesterone 3,20 - bis - (alkylene ketal), wherein the 11-oxygen function is keto or hydroxy and wherein the alkylene group contains not more than eight carbon atoms.

In carrying out the process of the present invention, a selected 11-oxygenated progesterone 3,20-bis-(alkylene ketal) is dissolved in an inert organic solvent such as chloroform, methylene chloride, ethylene dichloride, carbon tetrachloride, benzene, toluene, or the like, preferably a chlorinated hydrocarbon, and treated with an organic peracid such as performic, peracetic, perpropionic, perbenzoic, monoperphthalic acid or other organic peracids. Ten to 500 percent in excess of the theoretical amount is usually employed. The reaction is generally carried out at low temperatures such as between minus ten and plus ten degrees centigrade, zero to five degrees being preferred. However, higher or lower temperatures such as about minus thirty to plus forty degrees centigrade are operable.

At the end of the reaction, the mixture is neutralized, preferably with sodium or potassium carbonate or bicarbonate, washed with water, and the thus produced 11-oxygenated 5α,6α - oxidopregnane - 3,20 - dione 3,20-bis-(alkylene ketal) recovered by evaporation of the solvent. Recrystallization from organic solvents such as methanol, ethanol, Skellysolve B hexanes, heptanes, benzene, toluene, methylene chloride, ether or the like, provides pure 11-oxygenated 5α,6α-oxido-3,20-dione 3,20-bis-(alkylene ketal).

The thus obtained 11-oxygenated 5α,6α-oxidopregnane-3,20-dione 3,20-bis-(alkylene ketal), dissolved in a suitable organic solvent, is reacted with a fluorinating agent such as hydrogen fluoride to open the epoxy bond and to give 11-oxygenated 5α-hydroxy-6-fluoropregnane-3,20-dione 3,20-bis-(alkylene ketal). The hydrogen fluoride used can be gaseous hydrogen fluoride, hydrofluoric acid in aqueous solution, preferably of about 48 percent strength, or a metal fluoride releasing hydrogen fluoride when treated by an acid as, for instance, potassium or sodium bifluoride and an acid such as acetic, propionic or mineral acids such as perchloric, sulfuric acid or the like. The reaction is ordinarily performed at between about minus seventy and plus fifty degrees centigrade. If anhydrous hydrogen fluoride is used, usually low temperatures, that is, temperatures between about minus seventy and plus ten degrees, are preferred. The hydrogen fluoride, as for example, can be allowed to enter from a hydrogen fluoride gas cylinder into a vessel not reactive to hydrogen fluoride. If aqueous hydrogen fluoride is used the reaction can be carried out between about zero degrees and room temperature. Similarly, when the hydrogen fluoride is produced in situ by the reaction of a metallic fluoride such as potassium bifluoride and an acid, reaction temperatures between zero and ninety degrees centigrade are operative. At lower temperatures, solvents such as chloroform, methylene chloride, and particularly tetrahydrofuran are used. In the reaction of the epoxide with potassium bifluoride and an acid, organic acids are preferred such as acetic acid, propionic acid, formic acid or the like. However, other solvents such as neopentyl alcohol, isopropanol and the like with mineral acids such as sulfuric acid, perchloric acid or the like can be used. The reaction period is usually between fifteen minutes and four hours, with reaction times of approximately two to three hours usually being sufficient for anhydrous hydrogen fluoride. When potassium bifluoride is used, reaction times of several hours to five days are employed, depending on the temperature of reaction.

After the reaction is terminated the material is isolated by methods well known in the art such as neutralizing the excess of hydrogen fluoride present with a base, e. g., sodium bicarbonate, potassium bicarbonate, sodium hydroxide or the like, and extracting the product with water-immiscible solvents such as methylene chloride, chloroform, benzene, ether, hexanes and the like. Evaporation of the organic solvents used gives the crude material which is purified generally by recrystallization from organic solvents such as methanol, ethanol, acetone, Skellysolve B hexanes, benzene, methylene chloride or the like, to give pure 11-oxygenated 5α-hydroxy-6β-fluoropregnane-3,20-dione 3,20-bis-(alkylene ketal). However, with aqueous hydrogen fluoride, the ketal groups hydrolyze, yielding 11-oxygenated 5α-hydroxy-6β-fluoropregnane-3,20-dione.

The thus obtained 11-oxygenated 5α-hydroxy-6β-fluoropregnane-3,20-dione 3,20-bis-(alkylene ketal) is thereupon hydrolyzed in a water-miscible solvent, preferably in an aqueous alkanol or acetone acidic medium. As solvent alkanols, methanol and ethanol are preferred; however, other suitable water-miscible solvents such as tertiary butyl alcohol, propyl alcohol, isopropyl alcohol, dioxane, acetone, acetic acid or the like can be used. To the solution of the steroid is then added an organic or inorganic acid, preferably a mineral acid such as sulfuric acid or hydrochloric acid. Organic acids such as formic, acetic, propionic, and toluenesulfonic, can also be used. After standing, the solution is neutralized with aqueous sodium bicarbonate, sodium carbonate, potassium carbonate, sodium hydroxide, or other alkali solutions and concentrated to give a crude product consisting of 11-oxygenated 5α-hydroxy-6β-fluoropregnane-3,20-dione. The crude product can be purified using known techniques, for example, by recrystallization from organic solvents such as acetone, ethyl acetate, Skellysolve B hexanes, methanol, tertiary butyl alcohol, pyridine, ether, or the like, or mixtures thereof to give pure 11-oxygenated 5α-hydroxy-6β-fluoropregnane-3,20-dione.

The thus obtained 11-oxygenated 5α-hydroxy-6β-fluoropregnane-3,20-dione is thereupon dehydrated. Dehydration can be effected in alkali or in acid solution. In the preferred embodiment of the present invention acid dehydration is used. The steroid is dissolved or suspended in solvents unreactive to the acid employed, e. g., methylene chloride, chloroform, dioxane, and carbon tetrachloride, and to the solution or suspension is added the selected acid. Acids particularly useful for this reaction are strong acids, e. g., gaseous hydrogen chloride or hydrogen bromide, sulfuric acid and the like, with gaseous hydrogen chloride preferred. For dehydration with alkali the steroid is dissolved in methanol, ethanol, dioxane, or other convenient solvents unreactive to the base employed. The solution is advantageously purged of oxygen by bubbling nitrogen through the solution and then allowed to react with an oxygen-free alkali metal base solution. Sodium or potassium hydroxide are the preferred bases, although alkali metal alkoxides, barium hydroxide, calcium hydroxide, or the like, can be used.

Depending on the amount of acid or base used, the 6α- and 6β-isomers are obtained. The dehydration produces at first the 6β-isomer which, being less stable in strong acid or bases, rearranges to the 6α-isomer. If, at the start of the dehydration reaction, the medium was strongly acidic, only 11-oxygenated 6α-fluoroprogesterone is obtained. A weakly acidic or basic medium produces 11-oxygenated 6β-fluoroprogesterone, while a strongly basic medium yields the α-epimer, i. e., 11-oxygenated 6α-fluoroprogesterone. The 6β-epimer can subsequently be converted to the 6α-epimer by treatment with strong acid or base.

The dehydration step can also be accomplished using an N-bromoamide such as an N-bromoacylamide, e. g., N-bromosuccinimide or N-bromophthalimide.

The thus obtained 11-oxygenated 6-fluoroprogesterone is isolated from the reaction mixture and purified by conventional procedures, such as by diluting with water and either recovering by filtration or by extracting the mixture with a water-immiscible solvent, methylene chloride, chloroform, hexanes, benzene, ether and the like, and evaporating the solvent. The thus obtained solids are purified by conventional procedures, such as recrystallization from an organic solvent, such as methanol, ethanol, Skellysolve B hexanes, ethyl acetate, pyridine, benzene, or the like to obtain the pure 11-oxygenated 6-fluoroprogesterone.

To obtain 6-fluoro-9α-halo-11β-hydroxyprogesterone and 6-fluoro-9α-halo-11-ketoprogesterone, 6-fluoro-11β-hydroxy-4-pregnene-3,20-dione is dehydrated to the corresponding 6-fluoro-4,9(11)-pregnadiene-3,20-dione by methods known in the art, for example, by a dehydrating agent such as phosphorus oxychloride, thionyl chloride, hydrochloric acid or sulfuric acid and acetic acid or by pyrolysis as shown by U. S. Patents 2,640,838 and 2,640,839. The dehydration is conveniently effected by reacting the 11β-hydroxy compound with a carboxylic acid N-haloamide or N-haloimide in an organic base and treating the thus produced intermediate 11-hypohalite with dry sulfur dioxide in an organic base. As reagents for the production of an 11-hypohalite, the acid N-haloamide or acid N-haloimide are used wherein the halogen has an atomic number from 17 to 53, inclusive, preferably chlorine or bromine. Examples of such compounds are N-chloroacetamide, N-bromoacetamide, N-chlorosuccinimide, N-bromosuccinimide, N-iodosuccinimide, 3-bromo-5,5-dimethylhydantoin and 1,3-dibromo-5,5-dimethylhydantoin, and the like. Ordinarily, an amount in excess of a molar equivalent, calculated on the starting 11β-hydroxy steroid, is employed. The organic bases employed as solvents in the production of the 11-hypohalite are tertiary amines wherein the amino nitrogen is a member of an aromatic ring, for example, the pyridines, that is, pyridine, alkyl-pyridines, picoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents per mole of steroid, and is preferably the sole reaction solvent. The reaction to produce an 11-hypohalite is generally conducted under anhydrous conditions, the mixture containing less than 0.1 molar equivalent of water calculated per mole of steroid. Large proportions of water decrease the yield. The temperature of the reaction is between minus forty and plus seventy degrees centigrade, the lower limit being determined by the solubility of the steroid and reagents and the upper limit being determined by the amount of side reaction which normally accompanies reactions involving any halo compounds at higher temperatures. Ordinarily, room temperature (twenty to thirty degrees centigrade) is preferred for convenience and because of the consistently high yields of the desired product which are obtained at this temperature. A reaction period between five minutes to three hours is usually employed; at higher temperatures—above thirty degrees centigrade—short reaction times are sufficient to effect completion of the reaction.

The thus produced 6-fluoro-11β-hydroxy-4-pregnene-3,20-dione 11β-hypohalite is then treated with anhydrous sulfur dioxide in the presence of an organic base as described hereinbefore. The anhydrous sulfur dioxide can be in the form of gaseous or liquid sulfur dioxide or in the form of a material which in situ produces sulfur dioxide, for example, alkali metal hyposulfites. The reaction temperature ranges substantially within minus forty and plus seventy degrees centigrade, preferably room temperature (twenty to thirty degrees centigrade). The thus obtained product, 6-fluoro-4,9(11)-pregnadiene-3,20-dione, is isolated from the reaction mixture by conventional means such as extraction after the reaction mixture has been poured into an excess of water. Organic water-immiscible solvents such as ether, chloroform, methylene chloride, carbon tetrachloride, ethyl acetate, benzene, hexanes, or the like, are used for the extraction. The thus obtained extracts are conveniently washed, dried and thereupon evaporated to give the crude 6-fluoro-4,9(11)-pregnadiene-3,20-dione which is purified by conventional means such as recrystallization or chromatography, as deemed necessary.

The thus obtained 6-fluoro-4,9(11)-pregnadiene-3,20-dione is converted to 6-fluoro-9α-halo-11β-hydroxy-4-pregnene-3,20-dione by adding a hypohalous acid such as hypochlorous or hypobromous acid. The hypohalous acid is usually added by reacting an N-haloacidamide or N-haloacidimide with an acid to produce the hypohalous acid in situ.

In the preferred embodiment of the invention, the steroid, 6-fluoro-4,9(11)-pregnadiene-3,20-dione, is dissolved in an organic solvent such as methylene chloride, tertiary butyl alcohol, dioxane, tertiary amyl alcohol, or the like, and reacted at room temperature with the hypobromous or hypochlorous acid releasing agent in the presence of an acid. Such hypohalous acid releasing agents include N-bromoacetamide, N-chloroacetamide, N-bromosuccinimide, N-iodosuccinimide, N-chlorosuccinimide, or the like, in the presence of water and an acid such as perchloric acid, dilute sulfuric acid, or the like. The reaction is usually carried out at room temperature, between fifteen to thirty degrees centigrade, however, lower or higher temperatures are operative for the process. The hypohalous acid releasing agent is generally used in one molar or slightly increased, for example, 25 percent increased, amounts compared to a mole of steroid. A large excess of the hypohalous acid releasing agent, while operative, is undesirable, since the excess of hypohalous acid has a tendency to react on other positions of the molecule. The reaction period is rather short and may vary between about five minutes to one hour. At the end of the reaction time the excess of hypohalous acid is destroyed by the addition of sodium sulfite or other sulfites or hydrosulfites. The thus produced product, 6-fluoro-9α-halo-11β-hydroxy-4-pregnene-3,20-dione (6-fluoro-9α-halo-11β-hydroxyprogesterone), wherein the halogen atom is of atomic number 17 to 53, is isolated from the reaction mixture by adding an excess of water and extracting the compound with organic solvents or by recovering the precipitated compound through filtration. The crude product thus obtained may be recrystallized from organic solvents, such as acetone, Skellysolve B hexane hydrocarbons or the like to give pure 6-fluoro-9α-halo-11β-hydroxy-4-pregnene-3,20-dione.

Oxidizing the 6-fluoro-9α-halo-11β-hydroxy-4-pregnene-3,20-dione with chromic acid produces the corresponding adrenocortically active 6-fluoro-9α-halo-4-pregnene-3,11,20-trione (6-fluoro-9α-halo-11-ketoprogesterone).

In order to obtain the 9α-fluoro compounds, the 9β,11β-oxido intermediate of the aforementioned compound, 6-fluoro-9β,11β-oxido-4-pregnene-3,20-dione is prepared. In carrying out this reaction a 6-fluoro-9α-halo-11β-hydroxy-4-pregnene-3,20-dione wherein the halogen atom is of atomic number seventeen to 53, inclusive, is heated in solution with a mild base.

The bases useful for the cyclization include anhydrous potassium acetate, sodium bicarbonate, sodium acetate, or the like, with potassium acetate preferred. Solvents such as methanol, ethanol, acetone, tertiary butyl alcohol, or the like, may be used. The reaction time is between one-half hour and 24 hours; generally a period between three and twelve hours is sufficient. The thus obtained 6-fluoro-9β,11β-oxido-4-pregnene-3,20-dione is isolated from the reaction mixture by diluting the reaction mixture with excess water and filtering the product when crystalline, or by extracting with methylene chloride or other water-immiscible solvents such as ether, Skellysolve B hexanes, pentanes, benzene, ethyl acetate, methylene chloride, chloroform, carbon tetrachloride, pyridine, or the like. Evaporation of the solvent of the extracts produces the 6-fluoro-9β,11β-oxido-4-pregnene-3,20-dione.

The thus obtained 6-fluoro-9β,11β-oxido-4-pregnene-3,20-dione is thereupon reacted with hydrogen fluoride either as gas or liquified at low temperature or with aqueous hydrofluoric acid in solution. As solvents for this reaction methylene chloride, ethylene dichloride, tetrahydrofuran, chloroform, carbon tetrachloride, or the like, are useful. The reaction may be carried out at room temperature (twenty to thirty degrees centigrade) or, in the preferred embodiment of the invention, in tetrahydrofuran at low temperature, e. g., plus ten to minus eighty degrees centigrade with stirring. The period of reaction is from one to 24 hours, with a period from one to twelve hours usually sufficient. After the reaction is terminated, the mixture is poured into water and neutralized with a dilute base, e. g., sodium or potassium hydroxide or carbonate or a bicarbonate such as sodium bicarbonate, potassium bicarbonate, or the like. The reaction mixture is then extracted with a water-immiscible solvent such as methylene chloride, the organic layer is separated from the water mixture, washed with water, dried and evaporated to give the crude 6,9α-difluoro-11β-hydroxy-4-pregnene-3,20-dione (6,9α-difluoro-11β-hydroxyprogesterone). The thus obtained crude compound can be purified through recrystallization or chromatography.

Oxidation of the 6,9α-difluoro-11β-hydroxy-4-pregnene-3,20-dione with chromic acid produces the corresponding 6,9α-difluoro-4-pregnene-3,11,20-trione (6,9α-difluoro-11-ketoprogesterone).

1-dehydro-6-fluoro-11β-hydroxyprogesterone and 1-dehydro-6-fluoro-11-ketoprogesterone are produced, for example, by fermentation of the corresponding 6-fluoro-11β-hydroxyprogesterone or 6-fluoro-11-ketoprogesterone with *Septomyxa affinis*, A. T. C. C. 6737, or chemically, by treatment with selenium dioxide.

Similarly, 1 - dehydro - 6-fluoro-9α-halo-11β-hydroxyprogesterone and 1 - dehydro - 6-fluoro-9α-halo-11-ketoprogesterone are produced, for example, by fermentation of the corresponding 6-fluoro-9α-halo-11β-hydroxyprogesterone or 6-fluoro-9α-halo-11-ketoprogesterone with *Septomyxa affinis*, A. T. C. C. 6737, or chemically, by treatment with selenium dioxide. Alternatively, the order of steps may be reversed. Thus 1-dehydro-6-fluoro-9α-halo-11β - hydroxyprogesterone and 1-dehydro-6-fluoro-9α-halo-11-ketoprogesterone are produced, for example, by introduction of the 9α-halogen atom into 1-dehydro-6-fluoro-11β-hydroxyprogesterone in the manner described hereinbefore for the production of 6-fluoro-9α-halo-11β-hydroxyprogesterone and 6-fluoro-9α-halo-11-ketoprogesterone.

The following examples are illustrative of the products and process of the present invention, and are not to be construed as limiting.

EXAMPLE 1

*11-ketoprogesterone 3,20-bis-(ethylene ketal)*

A solution was prepared containing 100 grams of 11-ketoprogesterone, five grams of para-toluenesulfonic acid in 1.1 liters of benzene and 200 milliliters of ethylene glycol. This solution was refluxed vigorously with rapid stirring for four hours, using a water trap to remove the water formed in the reaction. After this period of reflux, the solution was cooled and washed with five percent aqueous sodium bicarbonate, then water, and dried over sodium sulfate. The solvents were removed by distillation and hot ethyl acetate was added. The ethyl acetate solution was chilled, diluted with ether, and filtered to give 68.7 grams of 11-ketoprogesterone 3,20-bis-(ethylene ketal), melting at 170 to 175 degrees centigrade.

In the same manner as shown above, treating 11-ketoprogesterone with alkanediols containing up to and including eight carbon atoms in the presence of benzene and paratoluenesulfonic acid is productive of the corresponding 11-ketoprogesterone 3,20-bis-(alkylene ketal).

The alkanediols used are preferably vicinal alkanediols such as alkane-1,2-diols, or the alkane-1,3-diols, such as, for example, ethylene glycol, propane-1,2-diol, propane-1,3-diol, butane-1,2-diol, butane-2,3-diol, pentane-1,2-diol, 3-methylpentane-1,2-diol, hexane-1,3-diol, octane-1,2-diol, and the like.

EXAMPLE 2

11β-hydroxyprogesterone 3,20-bis-(ethylene ketal)

In the same manner shown in Example 1, treating 11β-hydroxyprogesterone in benzene with ethylene glycol and para-toluenesulfonic acid is productive of 11β-hydroxyprogesterone 3,20-bis-(ethylene ketal).

Similarly, substituting for ethylene glycol the alkanediols containing up to and including eight carbon atoms, as illustrated in Example 1, is productive of the corresponding 11β-hydroxyprogesterone 3,20-bis-(alkylene ketals).

Alternatively, 11-ketoprogesteron 3,20-bis-(ethylene ketal) is treated with excess lithium aluminum hydride in ether solution for one hour at room temperature, the excess lithium aluminum hydride is destroyed by addition of water, or ethyl acetate followed by water, and the ether solution is separated, washed with water, and evaporated to give 11β-hydroxyprogesterone 3,20-bis-(ethylene ketal).

EXAMPLE 3

5α,6α-oxidopregnane-3,11,20-trione 3,20-bis-(ethylene ketal)

To a suspension of ten grams of anhydrous sodium acetate in 100 milliliters of forty percent peracetic acid, cooled in an ice bath, was added a solution of fifty grams of 11-ketoprogesterone 3,20-bis-(ethylene ketal) in 700 milliliters of chloroform. The heterogeneous mixture was stirred vigorously for two and one-half hours at ice bath temperature, the mixture was washed with water, five percent aqueous sodium hydroxide, and water, and then dried with magnesium sulfate, filtered, and evaporated to dryness under reduced pressure to give a white solid residue which was boiled with about 500 milliliters of methanol and cooled. The thus obtained precipitate was collected by filtration and recrystallized from ethyl acetate to give 31.2 grams of 5α,6α-oxidopregnane-3,11,20-trione 3,20-bis-(ethylene ketal) of melting point 208 to 214 degrees centigrade.

EXAMPLE 4

5α,6α-oxido-11β-hydroxypregnane-3,20-dione 3,20-bis-(ethylene ketal)

In the same manner as shown in Example 3, treating 11β-hydroxypregnane-3,20-dione 3,20-bis-(ethylene ketal) or the 11α-hydroxy epimer thereof in chloroform solution with peracetic acid and sodium acetate is productive of 5α,6α-oxido-11β-hydroxypregnane-3,20-dione 3,20-bis-(ethylene ketal), or the 11α-hydroxy epimer, respectively.

EXAMPLE 5

5α-hydroxy-6β-fluoropregnane-3,11,20-trione 3,20-bis-(ethylene ketal)

To a stirred mixture of 56 grams of potassium bifluoride, fifteen milliliters of acetic anhydride and 210 milliliters of acetic acid was added thirty grams of 5α,6α-oxidopregnane-3,11,20-trione 3,20-bis-(ethylene ketal). The reaction mixture was stirred two days at room temperature, then methylene chloride was added and the solution was washed three times with water. The thus obtained methylene chloride solution was evaporated to dryness and the residue chromatographed through a 500-gram column of synthetic magnesium silicate. Fractions eluted with two and three percent acetone in Skellysolve B hexanes were combined and rechromatographed through a 300-gram column of synthetic aluminum silicate to give 4.10 grams of fractions eluated with two percent and three percent acetone in Skellysolve B hexanes. The thus obtained combined fractions were recrystallized from methanol containing a trace of pyridine to give 3.3 grams of 5α-hydroxy-6β-fluoropregnane-3,11,20-trione 3,20-bis-(ethylene ketal), having a melting point of 138 to 142 degrees centigrade, and the analysis:

*Analysis.*—Calcd. for $C_{25}H_{37}FO_6$: C, 66.35; H, 8.24; F, 4.20. Found: C, 66.34; H, 8.32; F, 4.24.

5α-hydroxy-6β-fluoropregnane-3,11,20-trione 3,20-bis-(ethylene ketal) was prepared by an alternative route involving ketalization of the corresponding trione. A solution of four grams of 5α-hydroxy-6β-fluoropregnane-3,11,20-trione, from Example 10, 0.5 gram of paratoluenesulfonic acid and fifteen milliliters of ethylene glycol in 200 milliliters of benzene was stirred and refluxed rapidly. The condensate was passed through a Dean-Stark water trap to remove the water as it formed. During five hours of heating, 0.7 milliliter of water was collected. The reaction mixture was cooled, washed with dilute cold aqueous sodium bicarbonate, water, and dried. The solution was evaporated and the residue was recrystallized from methanol containing a trace of pyridine to give two crops of 5α-hydroxy-6β-fluoropregnane-3,11,20-trione 3,20-bis-(ethylene ketal), one of 3.4 grams having a melting point of 128 to 133 degrees centigrade and one of 0.8 gram having a melting point of 124 to 131 degrees centigrade. Infrared spectra showed that they were the same as the corresponding 3,20-bis-(ethylene ketal) of melting point 138 to 142 degrees centigrade prepared above.

EXAMPLE 6

5α,11β-dihydroxy-6β-fluoropregnane-3,20-dione 3,20-bis-(ethylene ketal)

To a solution of one gram of 5α-hydroxy-6β-fluoropregnane-3,11,20-trione 3,20-bis-(ethylene ketal) in 100 milliliters of ether at room temperature was added 0.3 gram of lithium aluminum hydride with stirring. After 1.25 hours, ethyl acetate and more ether was added. Ice was then added slowly until the inorganic precipitate coagulated. The organic layer was decanted and washed three times with water, dried over magnesium sulfate, filtered and concentrated to dryness, giving a residue of 5α,11β-dihydroxy-6β-fluoropregnane-3,20-dione 3,20-bis-(ethylene ketal). Infrared analysis of the thus obtained crude product showed the presence of hydroxyl and ketal bonds and the absence of ketone bonds. The crude product was used without purification in the next step.

Alternatively, 5α,11β-dihydroxy-6β-fluoropregnane-3,20-dione 3,20-bis-(ethylene ketal) is obtained by treating 5α,6α-oxido-11β-hydroxypregnane-3,20-dione 3,20-bis-(ethylene ketal), in the same manner as shown in Example 5, with potassium bifluoride, acetic acid and acetic anhydride for two days at room temperature, then isolating the thus produced 5α,11β-dihydroxy-6β-fluoropregnane-3,20-dione 3,20-bis-(ethylene ketal) by methylene chloride extraction and chromatographic separation.

EXAMPLE 7

5α,11β-dihydroxy-6β-fluoropregnane-3,20-dione

A solution of one gram of crude 5α,11β-dihydroxy-6β-fluoropregnane-3,20-dione 3,20-bis-(ethylene ketal) in a mixture of thirty milliliters of methanol and 2.5 milliliters of one normal aqueous sulfuric acid was boiled for thirty minutes, then concentrated to give 0.6 gram of 5α,11β-dihydroxy-6β-fluoropregnane-3,20-dione as crystals melting at 240 to 255 degrees centigrade, and a second crop of 0.1 gram. The two crops were combined and crystallized from methanol to give 0.4 gram of 5α,11β-dihydroxy-6β-fluoropregnane-3,20-dione having a melting point of 266 to 269 degrees centigrade, $[\alpha]_D$ plus 84 degrees (95 percent ethanol) and the following analysis:

*Analysis.*—Calcd. for $C_{21}H_{31}FO_4$: C, 68.82; H, 8.53; F, 5.18. Found: C, 68.70; H, 8.88; F, 5.31.

Example 8

6β-fluoro-11β-hydroxyprogesterone

To a slurry of 200 milligrams of 5α,11β-dihydroxy-6β-fluoropregnane-3,20-dione in forty milliliters of 95 percent ethanol was added two milliliters of one normal aqueous sodium hydroxide. The reaction mixture was stirred at room temperature for seven hours. The solution was clear after two hours, and after seven hours, two drops of acetic acid was added and the reaction mixture concentrated under diminished pressure to about three milliliters. One milliliter of water was added, resulting in crystallization. The crystals were collected by filtration, washed with alcohol-water mixture, dried and recrystallized from a mixture of acetone-Skellysolve B hexanes to give 6β-fluoro-11β-hydroxyprogesterone of melting point 191 to 196 degrees centigrade, $[\alpha]_D$ plus 121 degrees (chloroform) $a_M$ 11,600 at 234 millimicrons in 95 percent alcohol, and having the following analysis:

*Analysis.*—Calcd. for $C_{21}H_{29}FO_3$: C, 72.38; H, 8.39; F, 5.45. Found: C, 72.73; H, 8.49; F, 5.29.

Example 9

6α-fluoro-11β-hydroxyprogesterone

A slurry of 350 milligrams of 5α,11β-dihydroxy-6β-fluoropregnane-3,20-dione with 35 milliliters of chloroform was cooled in an ice-salt bath and saturated with hydrogen chloride gas. The steroid required about five minutes to dissolve. After thirty minutes a fast stream of nitrogen was passed through the reaction mixture, removing most of the hydrogen chloride. The solution was washed three times with water, dried over magnesium sulfate, filtered, and concentrated to dryness. The thus obtained residue was crystallized from an acetone-Skellysolve B hexanes mixture and gave two crops of crystals, a first crop of 0.2 gram with a melting point of 173 to 177 degrees centigrade and a second crop of 0.1 gram with a melting point of 176 to 178 degrees centigrade. The two crops were combined and recrystallized from a mixture of acetone and Skellysolve B hexanes to give 6α-fluoro-11β-hydroxyprogesterone having a melting point of 181 to 183 degrees centigrade, $[\alpha]_D$ plus 194 degrees (chloroform), $a_M$ 15,075 at 237 millimicrons in 95 percent alcohol, and the following analysis:

*Analysis.*—Calcd. for $C_{21}H_{29}FO_3$: C, 72.38; H, 8.39; F, 5.49. Found: C, 72.05; H, 8.90; F, 4.86.

Alternatively, treating a solution of 6β-fluoro-11β-hydroxyprogesterone in chloroform with hydrogen chloride gas, in the manner described above, is productive of 6α-fluoro-11β-hydroxyprogesterone.

Example 10

5α-hydroxy-6β-fluoropregnane-3,11,20-trione

A mixture of eighty grams of potassium bifluoride in 500 milliliters of acetic acid was stirred until it had nearly dissolved. Sixty grams of 5α,6α-oxidopregnane-3,11,20-trione 3,20-bis-(ethylene ketal) was then added and the reaction mixture stirred for eighteen hours at room temperature, followed by dilution with 700 milliliters of methylene chloride, washing three times with water, drying over magnesium sulfate, filtering, and concentrating to dryness to give an oily residue. The thus obtained residue was dissolved in 200 milliliters of 95 percent alcohol, and forty milliliters of one normal aqueous sulfuric acid was added. The solution was warmed on the steam bath for one and one-half hours and diluted with sixty milliliters of water to give a precipitate of 5α-hydroxy-6β-fluoropregnane-3,11,20-trione. The precipitate was collected by filtration from the still warm solution, washed with about twenty milliliters of 1:1 ethanol-water mixture and dried to give 12.8 grams of crystals having a melting point of 271 to 273 degrees centigrade, $[\alpha]_D$ plus 103 degrees in pyridine, and the following analysis:

*Analysis.*—Calcd. for $C_{21}H_{29}O_4F$: C, 69.20; H, 8.02; F, 5.21. Found: C, 69.48; H, 8.25; F, 4.54.

Example 11

6β-fluoro-11-ketoprogesterone

To a solution of 13.5 grams of 5α-hydroxy-6β-fluoropregnane-3,11,20-trione in 170 milliliters of pyridine was added 13.5 grams of N-bromoacetamide at room temperature. The reaction mixture was allowed to stand forty to fifty minutes, and then was cooled in an ice bath while a stream of sulfur dioxide gas was passed over the surface of the solution. After 22.5 grams of sulfur dioxide had been absorbed, the solution was stored at room temperature for one and one-quarter hours. The solution was again cooled with an ice bath and diluted with 450 milliliters of ten percent aqueous sulfuric acid. The solution was next saturated with salt and extracted three times with methylene chloride. The methylene chloride extracts were combined and washed once with dilute aqueous sulfuric acid and twice with water, then dried and evaporated to dryness. The thus obtained residue was recrystallized from ethyl acetate to give 8.15 grams of 6β-fluoro-11-ketoprogesterone having a melting point of 181 to 183.5 degrees centigrade, $[\alpha]_D$ plus 151 degress in chloroform, $a_M$ 13,200 at 228 millimirons in 95 percent ethanol, and the following analysis:

*Analysis.*—Calcd. for $C_{21}H_{27}FO_3$: C, 72.80; H, 7.86; F, 5.48. Found: C, 72.69; H, 8.09; F, 5.55.

Example 12

6α-fluoro-11-ketoprogesterone

A solution of one gram of 6β-fluoro-11-ketoprogesterone in ten milliliters of chloroform was cooled in an ice bath and saturated with hydrogen chloride gas. The reaction mixture was allowed to stand twenty minutes, and nitrogen was then bubbled through the mixture to remove most of the hydrogen chloride. The chloroform solution was next washed with water, dilute aqueous sodium bicarbonate, and brine, and then dried and evaporated to dryness. The thus obtained residue was crystallized first from methanol, then from ethyl acetate, to give 0.3 gram of 6α-fluoro-11-ketoprogesterone having a melting point of 184 to 187 degrees centigrade, $[\alpha]_D$ plus 248 degrees in chloroform, $a_M$ 14,675 at 223 millimicrons in 95 percent ethanol, and the following analysis:

*Analysis.*—Calcd. for $C_{21}H_{27}FO_3$: C, 72.80; H, 7.86; F, 5.48. Found: C, 72.76; H, 7.86; F, 5.70.

Alternatively, treating a solution of 0.5 gram of 6α-fluoro-11β-hydroxyprogesterone dissolved in 30 milliliters of acetic acid at room temperature with a solution of 0.15 gram of chromium trioxide in 0.5 milliliter of water for thirty minutes, destroying the excess chromium trioxide with methanol, diluting the reaction mixture with water, extracting with methylene chloride, and evaporating the methylene chloride solution to dryness, followed by crystallizing the residue from methanol, is productive of 6α-fluoro-11-ketoprogesterone.

It is to be understood that the invention is not to be limited to the exact details of operation or exact compounds shown and described, as obvious modifications and equivalents will be apparent to one skilled in the art; the invention is therefore to be limited only by the scope of the appended claims.

We claim:

1. An 11-oxygenated 6-fluoroprogesterone, wherein the 11-oxygen function is a member of the group consisting of hydroxy and keto.
2. 6-fluoro-11β-hydroxyprogesterone.
3. 6β-fluoro-11β-hydroxyprogesterone.
4. 6α-fluoro-11β-hydroxyprogesterone.
5. 6-fluoro-11-ketoprogesterone.
6. 6β-fluoro-11-ketoprogesterone.
7. 6α-fluoro-11-ketoprogesterone.

8. A compound of the formula:

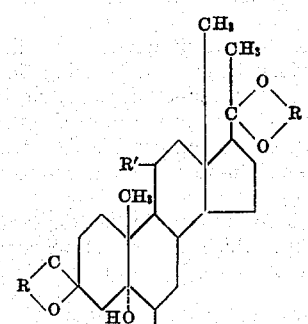

wherein R is an alkylene radical containing one to eight carbon atoms, inclusive, and the attaching oxygen-to-carbon bonds are separated by a chain of at least two and not more than three carbon atoms, and R' is a member of the group consisting of keto and hydroxy.

9. $5\alpha,11\beta$ - dihydroxy - $6\beta$ - fluoropregnane - 3,20 - dione 3,20-bis-(ethylene ketal).

10. $5\alpha$ - hydroxy - $6\beta$ - fluoropregnane - 3,11,20 - trione 3,20-bis-(ethylene ketal).

11. An 11-oxygenated $5\alpha$-hydroxy-6-fluoropregnane-3,20-dione wherein the 11-oxygen substituent is a member of the group consisting of hydroxy and keto.

12. $5\alpha,11\beta$-dihydroxy-$6\beta$-fluoropregnane-3,20-dione.

13. $5\alpha$-hydroxy-$6\beta$-fluoropregnane-3,11,20-trione.

14. A process for the production of 11-oxygenated 6-fluoroprogesterone, wherein the 11-oxygen substituent is a member of the group consisting of hydroxy and keto, which comprises: (1) reacting a compound of the formula:

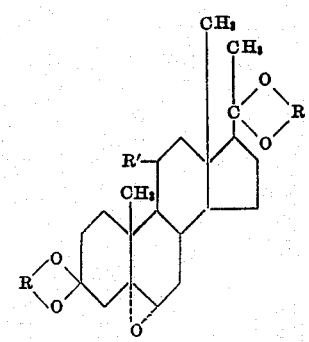

wherein R is an alkylene radical containing one to eight carbon atoms, inclusive, and the attaching oxygen-to-carbon bonds are separated by a chain of at least two and not more than three carbon atoms, and R' is a member of the group consisting of keto and hydroxy, with a fluorinating agent to produce a $5\alpha$-hydroxy-$6\beta$-fluoro compound of the formula:

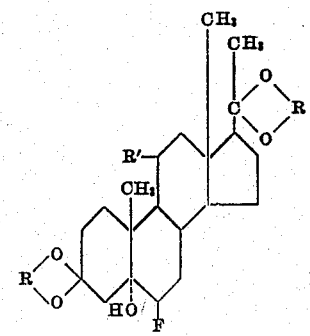

wherein R and R' are defined as above; (2) reacting the thus obtained fluorohydrin with a hydrolyzing agent to produce an 11-oxygenated $5\alpha$-hydroxy-$6\beta$-fluoropregnane-3,20-dione wherein the 11-oxygen substituent is a member of the group consisting of hydroxy and keto; and (3) reacting the thus obtained compound with a dehydrating agent to produce an 11-oxygenated 6-fluoroprogesterone wherein the 11-oxygen substituent is a member of the group consisting of hydroxy and keto.

15. A process for the production of 11-oxygenated 6-fluoroprogesterone, wherein the 11-oxygen substituent is a member of the group consisting of hydroxy and keto, which comprises: (1) reacting a compound of the formula:

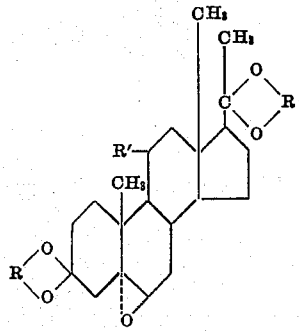

wherein R is an alkylene radical containing one to eight carbon atoms, inclusive, and the attaching oxygen-to-carbon bonds are separated by a chain of at least two and not more than three carbon atoms, and R' is a member of the group consisting of keto and hydroxy, with potassium bifluoride in acetic acid to produce a compound of the formula:

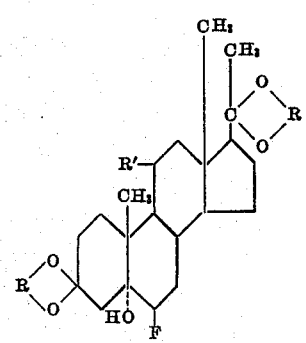

wherein R and R' are defined as above; (2) reacting the thus obtained fluorohydrin with a mineral acid to remove the ketal groups and produce an 11-oxygenated $5\alpha$-hydroxy-$6\beta$-fluoropregnane-3,20-dione wherein the 11-oxygen substituent is a member of the group consisting of hydroxy and keto; and (3) reacting the thus obtained compound with hydrogen chloride to produce an 11-oxygenated 6-fluoro-progesterone wherein the 11-oxygen substituent is a member of the group consisting of hydroxy and keto.

16. A process for the production of a steroid fluorohydrin of the formula:

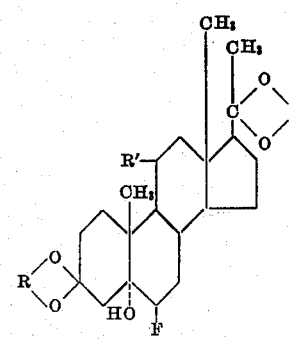

wherein R is an alkylene radical containing one to eight carbon atoms, inclusive, and the attaching oxygen-to-carbon bonds are separated by a chain of at least two and not more than three carbon atoms, and R' is a member of the group consisting of hydroxy and keto, which comprises: reacting a compound of the formula:

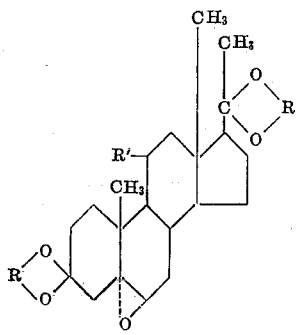

wherein R and R' are defined as above, with hydrogen fluoride.

17. A process for the production of 11-oxygenated 6-fluoroprogesterone which comprises: reacting 11-oxygenated 5α-hydroxy-6β-fluoropregnane-3,20-dione wherein the 11-oxygen substituent is a member of the group consisting of hydroxy and keto, with a dehydrating agent to give the corresponding 11-oxygenated 6-fluoroprogesterone.

18. A process for the production of 6-fluoro-11-ketoprogesterone which comprises: reacting 5α-hydroxy-6β-fluoropregnane-3,11,20-trione with an acid dehydrating agent.

19. A process for the production of 6-fluoro-11-ketoprogesterone which comprises: reacting 5α-hydroxy-6β-fluoropregnane-3,11,20-trione with a dilute base.

20. A process for the production of 6-fluoro-11-ketoprogesterone which comprises: reacting 5α-hydroxy-6β-fluoropregnane-3,11,20-trione with an N-bromoamide and sulfur dioxide.

21. A process for the production of 6-fluoro-11β-hydroxyprogesterone which comprises: reacting 5α,11β-dihydroxy-6-fluoropregnane-3,20-dione with an acid dehydrating agent.

22. A process for the production of 6-fluoro-11β-hydroxyprogesterone which comprises: reacting 5α,11β-dihydroxy-6-fluoropregnane-3,20-dione with a dilute base.

23. A process for the production of 11-oxygenated 6α-fluoroprogesterone which comprises: reacting an 11-oxygenated 6β-fluoroprogesterone wherein the 11-oxygen substituent is a member of the group consisting of hydroxy and keto with hydrogen chloride.

24. 6β-fluoro-11α-hydroxyprogesterone.

25. 6α-fluoro-11α-hydroxyprogesterone.

No references cited.